United States Patent
Kasemi et al.

(10) Patent No.: US 12,275,817 B2
(45) Date of Patent: Apr. 15, 2025

(54) HARDENER FOR EPOXY RESINS

(71) Applicant: SIKA TECHNOLOGY AG, Baar (CH)

(72) Inventors: Edis Kasemi, Zürich (CH); Andreas Kramer, Zürich (CH); Ursula Stadelmann, Zürich (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 812 days.

(21) Appl. No.: 17/272,412

(22) PCT Filed: Sep. 30, 2019

(86) PCT No.: PCT/EP2019/076493
§ 371 (c)(1),
(2) Date: Mar. 1, 2021

(87) PCT Pub. No.: WO2020/070083
PCT Pub. Date: Apr. 9, 2020

(65) Prior Publication Data
US 2021/0332181 A1 Oct. 28, 2021

(30) Foreign Application Priority Data
Oct. 1, 2018 (EP) .................................... 18197987

(51) Int. Cl.
*C08G 59/50* (2006.01)
*C08K 5/17* (2006.01)
*C08L 63/00* (2006.01)
*C08L 79/02* (2006.01)
*C09D 163/00* (2006.01)
*C09J 163/00* (2006.01)

(52) U.S. Cl.
CPC ....... *C08G 59/502* (2013.01); *C08G 59/5033* (2013.01); *C08K 5/17* (2013.01); *C08L 63/00* (2013.01); *C08L 79/02* (2013.01); *C09D 163/00* (2013.01); *C09J 163/00* (2013.01); *C08L 2205/025* (2013.01)

(58) Field of Classification Search
CPC .... C08G 59/502; C08G 59/5033; C08K 5/17; C08L 63/00; C08L 79/02; C08L 2205/025; C08D 163/00; C08J 163/00
See application file for complete search history.

(56) References Cited

U.S. PATENT DOCUMENTS

| | | |
|---|---|---|
| 3,327,016 A | 6/1967 | Lee et al. |
| 2009/0023846 A1 | 1/2009 | Vedage et al. |
| 2014/0107313 A1* | 4/2014 | Burckhardt ............ C08G 59/50 252/182.13 |
| 2015/0344406 A1 | 12/2015 | Kasemi et al. |
| 2018/0327629 A1 | 11/2018 | Tomura et al. |

FOREIGN PATENT DOCUMENTS

| | | |
|---|---|---|
| DE | 2853752 A1 | 10/1979 |
| EP | 2 546 230 A1 | 1/2013 |
| EP | 2 943 464 B1 | 3/2017 |
| EP | 3 138 863 A1 | 3/2017 |
| EP | 3 144 335 A1 | 3/2017 |
| WO | 2016/023839 A1 | 2/2016 |
| WO | WO-2016151007 A1 * | 9/2016 ............ B32B 27/38 |

OTHER PUBLICATIONS

Hyperlink to Espacenet for WO-2016151007-A1: https://worldwide.espacenet.com/publicationDetails/biblio?CC=WO&NR=2016151007A1&KC=A1&FT=D&ND=3&date=20160929&DB=&locale=en_EP . Accessed:Nov. 8, 2023 (Year: 2016).*
Nov. 21, 2019 Search Report issued in International Patent Application No. PCT/EP2019/076493.
Mar. 23, 2021 International Preliminary Report on Patentability issued in International Patent Application No. PCT/EP2019/076493.

\* cited by examiner

*Primary Examiner* — Catherine S Branch
*Assistant Examiner* — Andrea Wu
(74) *Attorney, Agent, or Firm* — Oliff PLC

(57) ABSTRACT

A curing agent for epoxy resins, including at least one amine A1 of the formula (I) and at least one amine A2 which is a polyalkyleneamine or polyethyleneimine, where the weight ratio between amine A1 and amine A2 is in the range from 20/1 to 1/2. The curing agent of the invention enables inexpensive and low-emission epoxy resin products having good processability, long pot life, surprisingly rapid curing, especially also under cold conditions, high strength, high bond strengths, high glass transition temperature and a low tendency to yellowing, with formation of surprisingly nice surfaces having barely any blushing-related defects even in the case of two-dimensional application and under moist and cold conditions. Such epoxy resin products are advantageously usable as coating, especially for floors, or as adhesive.

13 Claims, No Drawings

HARDENER FOR EPOXY RESINS

TECHNICAL FIELD

Curing agents for epoxy resins, epoxy resin compositions and the use thereof, especially as coating or adhesive.

STATE OF THE ART

Epoxy resin-based coatings and adhesives are widely used in the building trade. They consist of liquid or pasty resin and curing agent components, which are mixed before application and then cure at ambient temperatures in the range from about 5 to 35° C. to form a material of high strength and stability. Such epoxy resin compositions, especially in the case of two-dimensional application, have a tendency to surface defects such as haze, spots, roughness or tack, which is also referred to as "blushing". Blushing is caused by the amines present in the curing agent component forming a salt with carbon dioxide ($CO_2$) from the air and occurs particularly at high humidity and low temperatures. Especially in esthetically demanding coating applications such as floor coatings, the occurrence of blushing-related surface defects is extremely disadvantageous and usually necessitates laborious reworking or overcoating of the faulty areas or often even of the entire coating.

The viscosity of an epoxy resin composition is reduced using thinners so that it is easy to apply and gives good wetting of the substrate surfaces. At the same time, thinners also reduce the susceptibility to blushing. The customary thinners, such as benzyl alcohol, are volatile compounds (VOC or SVOC) that are not incorporated into the polymer matrix during curing and thus may result in emissions. For low-emission products, for which there is a growing demand from consumers, this means that thinners may be used only in small amounts or not at all.

For reduction of blushing and as reactive diluent, it is possible to use alkylated amines in the curing agent component, as described in EP 2,943,464, WO 2016/023839, EP 3,138,863 or EP 3,144,335. But alkylated amines lead to slowed curing, and lower the glass transition temperature obtained after curing, which makes them unattractive particularly for adhesive applications.

Polyalkyleneimines such as TETA, TEPA or N4 amine are commonly used curing agents for epoxy resins. They enable rapid curing, but increase propensity to blushing-related defects and can cause elevated brittleness after curing, which can be manifested in low extensibility and reduced strength and bond strength. To have a high bond strength, an adhesive must not be too brittle, since it can otherwise break even under low stress in spite of good adhesion.

SUMMARY OF THE INVENTION

It is an object of the present invention to provide a curing agent for epoxy resins that overcomes the disadvantages of the prior art in relation to viscosity, blushing, curing rate, glass transition temperature and brittleness.

This object is achieved by the curing agent as described in claim 1. The curing agent of the invention is based on a particular combination of at least one alkylated amine A1 and at least one amine A2 which is a polyalkyleneamine or polyethyleneimine.

The curing agent of the invention has low viscosity and gives very good thinning of the resin componentl. In spite of the presence of amine A2, which is prone to cause blushing, it surprisingly shows very little tendency to blushing-related defects. At the same time, it enables a high curing rate, even in the case of a surprisingly low proportion of amine A2, without any excessive adverse effect on pot life. Curing gives rise to a hard material of low brittleness with high bond strength and sufficiently high glass transition temperature. Alkylated amines, for production-related reasons, are somewhat more expensive than the amines typically used as curing agents for epoxy resins. The additional use of an inexpensive and widely available amine A2 also means that the curing agent of the invention is particularly economically attractive.

The curing agent of the invention enables low-emission epoxy resin products having good processability and rapid curing, especially also under cold conditions. In the case of two-dimensional application, even under moist and cold conditions, particularly nice surfaces are formed with barely any blushing-related defects.

After curing, the products show high strength, high bond strengths and a high glass transition temperature; moreover, they have barely any tendency to yellowing. Such epoxy resin products are advantageously usable as coatings, especially as floor coatings, where low-emission or emission-free products are desired, and which have low viscosity and good processability even with little or without thinner and must meet high esthetic demands, and as adhesives, where fast-curing products having a long pot life and open time, high strength, high bond strength and high glass transition temperature are required.

Further aspects of the invention are the subject of further independent claims. Particularly preferred embodiments of the invention are the subject of the dependent claims.

Ways of Executing the Invention

The invention provides a curing agent for epoxy resins comprising at least one amine A1 of the formula (I)

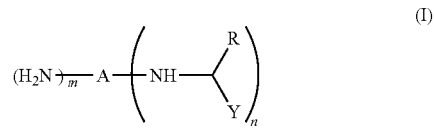

where
m is 0 or 1, n is 1 or 2 and (m+n) is 2,
A is 1,2-ethylene or 1,2-propylene,
R is H or an alkyl radical having 1 to 12 carbon atoms, and
Y is an optionally substituted aromatic or cycloaliphatic radical having 6 to 20 carbon atoms,
and at least one amine A2 which is a polyalkyleneamine or polyethyleneimine, where the weight ratio between amine A1 and amine A2 is in the range from 20/1 to 1/2.

"Polyalkyleneamine" refers to a linear polyamine containing at least three amino groups separated from one another by alkylene radicals.

"Polyethyleneimine" refers to a product from the polymerization of ethyleneimine. It consists mainly of primary, secondary and tertiary amino groups joined via 1,2-ethylene radicals.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

"Amine hydrogen" refers to the hydrogen atoms of primary and secondary amino groups.

"Amine hydrogen equivalent weight" refers to the mass of an amine or an amine-containing composition that contains one molar equivalent of amine hydrogen. Substance names beginning with "poly", such as polyamine or polyepoxide, refer to substances containing, in a formal sense, two or more of the functional groups that occur in their name per molecule.

A "thinner" refers to a substance that is soluble in an epoxy resin and lowers its viscosity, and that is not chemically incorporated into the epoxy resin polymer during the curing process.

"Molecular weight" refers to the molar mass (in g/mol) of a molecule. "Average molecular weight" refers to the number average $M_n$ of a polydisperse mixture of oligomeric or polymeric molecules, which is typically determined by means of gel permeation chromatography (GPC) against polystyrene as standard.

"Pot life" refers to the duration of processability of an epoxy resin composition, i.e. the maximum possible time span between the mixing of the components and the application of the mixed composition in which it is in a sufficiently free-flowing state and is able to wet the substrate surfaces.

"Open time" of an adhesive refers to the maximum time span possible for a cohesive bond between the application of the adhesive and the joining of the parts to be bonded.

"Room temperature" refers to a temperature of 23° C.

The curing agent is preferably not water-based. It especially contains less than 10% by weight, preferably less than 5% by weight, more preferably less than 2.5% by weight, of water. Such a curing agent is particularly suitable for the curing of non-emulsified epoxy resins and enables very hydrophobic and stable materials.

A is preferably 1,2-ethylene. Such an amine A1 enables particularly rapid curing.

R is preferably H or methyl or phenyl, more preferably H or methyl, especially H. Such an amine A1 is obtainable in a particularly simple manner.

Y is preferably an optionally substituted phenyl, 1-naphthyl or cyclohexyl radical. Y is more preferably a phenyl radical. Such an amine A1 enables particularly nice surfaces.

The amine A1 of the formula (I) is preferably selected from the group consisting of N-benzylethane-1,2-diamine, N,N'-dibenzylethane-1,2-diamine, N-(1-naphthylmethyl)ethane-1,2-diamine, N-cyclohexylmethylethane-1,2-diamine, N-benzylpropane-1,2-diamine and N,N'-dibenzylpropane-1,2-diamine.

Preference is given to amines A1 of the formula (I) in which m and n are each 1. These enable particularly rapid curing.

Such an amine A1 of the formula (I) optionally additionally contains a certain proportion of dialkylated amine, i.e. amine A1 of the formula (I) in which m is 0 and n is 2. The weight ratio here between monoalkylated amine (n and m are each 1) and dialkylated amine (n is 2) is preferably at least 50/50, more preferably at least 65/35, especially at least 70/30.

Particular preference is given to N-benzylethane-1,2-diamine or N-benzylpropane-1,2-diamine.

N-Benzylethane-1,2-diamine may contain proportions of N,N'-dibenzylethane-1,2-diamine. N-Benzylpropane-1,2-diamine may contain proportions of N,N'-dibenzylpropane-1,2-diamine.

The most preferred amine A1 of the formula (I) is N-benzylethane-1,2-diamine. This optionally contains up to 35% by weight of N,N'-dibenzylethane-1,2-diamine based on the sum total of the two amines. This enables particularly rapid curing.

Preference is given to using the amine A1 of the formula (I) as a constituent of a reaction mixture from the partial alkylation of ethane-1,2-diamine or propane-1,2-diamine with at least one alkylating agent.

Preferably, the alkylation is a reductive alkylation, where the alkylating agent used is an aldehyde or ketone and hydrogen.

Preference is given to conducting the reductive alkylation in the presence of a suitable catalyst. Preferred catalysts are palladium on charcoal (Pd/C), platinum on charcoal (Pt/C), Adams' catalyst or Raney nickel, especially palladium on charcoal or Raney nickel.

When molecular hydrogen is used, the reductive alkylation is preferably worked in a pressure apparatus at a hydrogen pressure of 5 to 150 bar, especially 10 to 100 bar. This can be effected in a batchwise process or preferably in a continuous process.

The reductive alkylation is preferably conducted at a temperature in the range from 40 to 120° C., especially 60 to 100° C.

Ethane-1,2-diamine or propane-1,2-diamine is preferably used here in a stoichiometric excess relative to the aldehyde or ketone and, after the alkylation, the excess is at least partly removed from the reaction mixture, especially by means of stripping. If desired, the reaction mixture may then be purified further, especially by freeing the monoalkylated amine at least partly of the dialkylated amine by means of distillation.

The inventive curing agent for epoxy resins also contains at least one amine A2 which is a polyalkyleneamine or polyethyleneimine.

Suitable polyethyleneimines are products from the polymerization of ethyleneimine. These are mixtures of various molecules having molecular weight distributions as typically arise in polymerizations.

The polyethyleneimine preferably has an average molecular weight $M_n$ in the range from 200 to 1500 g/mol, especially 200 to 1000 g/mol.

Suitable polyethyleneimines are preparable by known processes, or they are commercially available, especially as Lupasol® FG or Lupasol® G 20 anhydrous (from BASF), or as Epomin® SP-003, Epomin® SP-006, Epomin® SP-012 or Epomin® SP-018 (from Nippon Shokubai).

Preferred amines A2 are polyalkyleneamines, especially those of the formula (II) shown below. This affords epoxy resin products having particularly good processability.

The amine A2 is preferably a polyalkyleneamine of the formula (II)

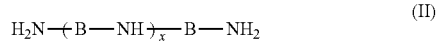

(II)

where
x is an integer from 1 to 6, and
B is independently an alkylene radical having 2 to 6 carbon atoms.

An amine A2 of the formula (II) is especially used in a technical grade quality. A technical grade quality typically results from the preparation process for the amine of the formula (II), where the content of polyalkyleneamine of the formula (II) can be different according to the mode of preparation and purification process.

A suitable polyalkyleneamine of the formula (II) is especially diethylenetriamine (DETA), triethylenetetramine (TETA), tetraethylenepentamine (TEPA), pentaethylenehexamine (PEHA), higher homologs of linear polyethyleneamines, dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine, N,N'-bis(3-amino-1-ethylpropyl)-2-methylpentane-1,5-diamine or bis(6-aminohexyl)amine (BHMT).

Preferably, x is 1 or 2 or 3 or 4.

Preferably, B is 1,2-ethylene or 1,3-propylene or 1,6-hexylene.

Preferred polyalkyleneamines of the formula (II) are TETA, TEPA, PEHA or N4 amine. These amines A2 afford epoxy resin products having particularly rapid curing and high glass transition temperature.

A further preferred polyalkyleneamine of the formula (II) is BHMT. This amine A2 affords adhesives having particularly low brittleness and particularly high bond strength. BHMT in particular is used here in a technical grade quality as obtained in the preparation of hexane-1,6-diamine. Such technical grade qualities of BHMT are commercially available, for example as Dytek® BHMT Amine (50-78%) (from Invista).

It may be advantageous to use a mixture of two or more amines A2, especially a mixture of BHMT and TETA, TEPA, PEHA or N4 amine. Such a mixture enables a less brittle material of particularly high bond strength at high glass transition temperature.

The weight ratio between amine A1 and amine A2 is preferably in the range from 15/1 to 1/2. This affords epoxy resin products having long pot life, rapid curing, high robustness to blushing-related defects and high glass transition temperature.

In one embodiment of the invention, the weight ratio between amine A1 and amine A2 is preferably in the range from 15/1 to 1/1, especially 10/1 to 2/1. Such a curing agent is particularly suitable for epoxy resin coatings, where robustness to blushing-related defects must be particularly high.

In a further embodiment of the invention, the weight ratio between amine A1 and amine A2 is preferably in the range from 10/1 to 1/2, especially 5/1 to 1/2. Such a curing agent is particularly suitable for epoxy resin adhesives, where bond strength and glass transition temperature are to be particularly high.

The curing agent optionally contains at least one further amine. Such a further amine can influence the properties of the curing agent in a desired manner, for example lower viscosity, increase reactivity, adjust the amine hydrogen equivalent weight or improve compatibility with the epoxy resin, or it may have economic benefits.

Preferred further amines are aliphatic, cycloaliphatic or araliphatic polyamines having at least 2, especially at least 3, amine hydrogens, such as, in particular, 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexane-1,6-diamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, 1,3-bis(aminomethyl)cyclohexane, 1,4-bis(aminomethyl)cyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2(4)-methyl-1,3-diaminocyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA), 1,4-bis(aminomethyl)benzene, bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, cycloaliphatic diamines containing ether groups from the propoxylation and subsequent amination of 1,4-dimethylolcyclohexane, especially obtainable as Jeffamine® RFD-270 (from Huntsman), or polyoxyalkylenedi- or -triamines, especially Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000 (all from Huntsman), or corresponding amines from BASF or Nitroil, 2-aminoethylpiperazine, 3-dimethylaminopropylamine (DMAPA), 3-(3-(dimethylamino)propylamino)propylamine (DMAPAPA), N-benzyldiethylenetriamine, N-benzyltriethylenetetramine, N,N'-dibenzyltriethylenetetramine, N''-benzyl-N,N'-bis(3-aminopropyl)ethylenediamine, N'',N'''-dibenzyl-N,N'-bis(3-aminopropyl)ethylenediamine, N-benzyl-1,3-bis(aminomethyl)benzene, N,N'-dibenzyl-1,3-bis(aminomethyl)benzene, N-(2-ethylhexyl)-1,3-bis(aminomethyl)benzene, N,N'-bis(2-ethylhexyl)-1,3-bis(aminomethyl)benzene, styrenized MXDA (available as Gaskamine® 240 from Mitsubishi Gas Chemical), adducts of the abovementioned or further polyamines with epoxides or epoxy resins, especially adducts with diepoxides or monoepoxides, or polyamidoamines, especially reaction products of a mono- or polybasic carboxylic acid or ester or anhydride thereof, especially a dimer fatty acid, with an aliphatic, cycloaliphatic or aromatic polyamine used in stoichiometric excess, especially a polyalkyleneamine, for example DETA or TETA, or Mannich bases, especially phenalkamines, i.e. reaction products of phenols, especially cardanol, with aldehydes, especially formaldehyde, and polyamines.

The curing agent of the invention preferably comprises at least one further amine selected from the group consisting of TMD, 1,2-, 1,3- or 1,4-diaminocyclohexane, 1,3-bis(aminomethyl)cyclohexane, 1,4-bis(aminomethyl)cyclohexane, bis(4-aminocyclohexyl)methane, IPDA, 2(4)-methyl-1,3-diaminocyclohexane, MXDA, polyoxypropylenediamines having an average molecular weight $M_n$ in the range from 200 to 500 g/mol, DMAPAPA, adducts of these or further polyamines with mono- or diepoxides and Mannich bases.

Among these, preference is given to TMD, 1,3-bis(aminomethyl)cyclohexane, IPDA, MXDA or DMAPAPA.

Among these, preference is further given to an adduct of MXDA and/or IPDA and/or TETA with a bisphenol A or bisphenol F diglycidyl ether, especially in a molar ratio between the amine molecule and the epoxy groups in the range from 3:1 to 50:1.

Among these, preference is further given to an adduct of MPMD or propane-1,2-diamine with cresyl glycidyl ether, especially ortho-cresyl glycidyl ether. The adduct formation is preferably performed with an excess of MPMD or propane-1,2-diamine over cresyl glycidyl ether, and the amine that has not formed an adduct is preferably removed after the reaction by means of distillation.

The curing agent may preferably comprise a combination of two or more of the further amines mentioned.

A particularly preferred further amine is IPDA. Such a curing agent is widely available, inexpensive and enables epoxy resin products having particularly high hardness and glass transition temperature.

A particularly preferred further amine is also DMAPAPA. Such a curing agent is particularly suitable for epoxy resin adhesives. It enables particularly high compressive strengths and particularly high bond strengths, especially on steel.

The curing agent optionally comprises at least one thinner.

Especially suitable are xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, diphenylmethane, diisopropylnaphthalene, mineral oil fractions, for example Solvesso® grades (from Exxon), alkylphenols such as tert-butylphenol, nonylphenol, dodecylphenol, cardanol (from cashew nutshell oil, containing 3-(8,11,14-pentadecatrienyl)phenol as its main constituent), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides.

Preferred thinners have a boiling point of more than 200° C.

The thinner is preferably selected from the group consisting of benzyl alcohol, styrenized phenol, ethoxylated phenol, aromatic hydrocarbon resins containing phenol groups, especially the Novares® LS 500, LX 200, LA 300 or LA 700 grades (from Rütgers), diisopropylnaphthalene and cardanol.

Particular preference is given to benzyl alcohol.

Thinners containing phenol groups are also effective as accelerator.

The curing agent optionally comprises at least one accelerator.

Suitable accelerators are substances which accelerate the reaction between amino groups and epoxy groups, especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids such as, in particular, phosphoric acid, or mixtures of the aforementioned acids and acid esters; nitrates such as calcium nitrate in particular; tertiary amines such as, in particular, 1,4-diazabicyclo[2.2.2]octane, benzyldimethylamine, α-methylbenzyldimethylamine, triethanolamine, dimethylaminopropylamine, imidazoles such as, in particular, N-methylimidazole, N-vinylimidazole or 1,2-dimethylimidazole, salts of such tertiary amines, quaternary ammonium salts, such as, in particular, benzyltrimethylammonium chloride, amidines such as, in particular, 1,8-diazabicyclo[5.4.0]undec-7-ene, guanidines such as, in particular, 1,1,3,3-tetramethylguanidine, phenols, especially bisphenols, phenolic resins or Mannich bases such as, in particular, 2-(dimethylaminomethyl)phenol, 2,4,6-tris(dimethylaminomethyl)phenol or polymers of phenol, formaldehyde and N,N-dimethylpropane-1,3-diamine, phosphites such as, in particular, di- or triphenyl phosphites, or compounds having mercapto groups.

Preferred accelerators are acids, nitrates, tertiary amines or Mannich bases. Particular preference is given to salicylic acid or calcium nitrate or 2,4,6-tris(dimethylaminomethyl) phenol or a combination thereof.

Most preferred is a combination of calcium nitrate and 2,4,6-tris(dimethylaminomethyl)phenol. This achieves particularly rapid curing, especially also at low temperatures, and particularly high hardnesses.

Calcium nitrate is especially used in the form of an aqueous solution having 20% to 70% by weight of calcium nitrate.

The invention further provides an epoxy resin composition comprising
 a resin component comprising at least one epoxy resin and
 a curing agent component comprising the above-described curing agent containing at least one amine A1 of the formula (I) and at least one amine A2 which is a polyalkyleneamine or polyethyleneimine.

A suitable epoxy resin is obtained in a known manner, especially from the oxidation of olefins or from the reaction of epichlorohydrin with the polyols, polyphenols or amines.

Suitable epoxy resins are especially aromatic epoxy resins, especially the glycidyl ethers of:
 bisphenol A, bisphenol F or bisphenol A/F, where A stands for acetone and F for formaldehyde, which served as reactants for the preparation of these bisphenols. In the case of bisphenol F, positional isomers may also be present, especially derived from 2,4'- or 2,2'-hydroxyphenylmethane.
 dihydroxybenzene derivatives such as resorcinol, hydroquinone or catechol;
 further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'- dihydroxydiphenyl (DOD), 4,4'-dihydroxybenzophenone, bis(2-hydroxynaphth-1-yl) methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;

novolaks, which are especially condensation products of phenol or cresols with formaldehyde or paraformaldehyde or acetaldehyde or crotonaldehyde or isobutyraldehyde or 2-ethylhexanal or benzaldehyde or furfural;

aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, especially glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

a hydrogenated bisphenol A, F or NF liquid resin, or the glycidylation products of hydrogenated bisphenol A, F or NF;

an N-glycidyl derivative of amides or heterocyclic nitrogen bases, such as triglycidyl cyanurate or triglycidyl isocyanurate, or reaction products of epichlorohydrin with hydantoin.

epoxy resins from the oxidation of olefins such as, in particular, vinylcyclohexene, dicyclopentadiene, cyclohexadiene, cyclododecadiene, cyclododecatriene, isoprene, 1,5-hexadiene, butadiene, polybutadiene or divinylbenzene.

The epoxy resin is preferably a liquid resin or a mixture containing two or more liquid epoxy resins.

"Liquid epoxy resin" refers to an industrial polyepoxide having a glass transition temperature below 25° C.

The resin component optionally additionally contains proportions of solid epoxy resin.

The epoxy resin is especially a liquid resin based on a bisphenol, in particular a bisphenol A diglycidyl ether and/or bisphenol F diglycidyl ether, as are commercially available, for example, from Olin, Huntsman or Momentive. These liquid resins have a low viscosity for epoxy resins and enable rapid curing and high hardnesses. They may contain proportions of solid bisphenol A resin or novolak glycidyl ethers.

The resin component may contain a reactive diluent.

Preferred reactive diluents are reactive diluents containing epoxy groups, especially butanediol diglycidyl ether, hexanediol diglycidyl ether, trimethylolpropane di- or triglycidyl ether, phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as, in particular, $C_8$- to $C_{10}$- or $C_{12}$- to $C_{14}$- or $C_{13}$- to $C_{15}$-alkyl glycidyl ethers.

The epoxy resin composition preferably contains at least one further constituent selected from the group consisting of thinners, accelerators and fillers.

Suitable accelerators are those already mentioned, especially salicylic acid, calcium nitrate or 2,4,6-tris(dimethylaminomethyl)phenol or a combination thereof. Most preferred is a combination of calcium nitrate and 2,4,6-tris (dimethylaminomethyl)phenol. This achieves particularly rapid curing, especially also at low temperatures, and particularly high hardnesses.

Suitable thinners are those already mentioned, especially those having a boiling point of more than 200° C.

The thinner is preferably selected from the group consisting of benzyl alcohol, styrenized phenol, ethoxylated phenol, aromatic hydrocarbon resins containing phenol groups, especially the Novares® LS 500, LX 200, LA 300 or LA 700 grades (from Rutgers), diisopropylnaphthalene and cardanol.

Particular preference is given to benzyl alcohol.

The epoxy resin composition preferably contains only a small content of thinners. It preferably contains less than 25% by weight, more preferably less than 15% by weight, especially less than 10% by weight, of thinners. This enables low-emission or emissions-free epoxy resin products.

Suitable fillers are, in particular, ground or precipitated calcium carbonate, which is optionally coated with fatty acid, in particular stearates, baryte (heavy spar), talc, quartz powder, quartz sand, silicon carbide, iron mica, dolomite, wollastonite, kaolin, mica (potassium aluminum silicate), molecular sieve, aluminum oxide, aluminum hydroxide, magnesium hydroxide, silica, cement, gypsum, fly ash, carbon black, graphite, metal powders such as aluminum, copper, iron, zinc, silver or steel, PVC powder or hollow beads.

Preference is given to calcium carbonate, quartz powder, and quartz sand.

The epoxy resin composition optionally comprises further auxiliaries and additives, in particular the following:

reactive diluents, in particular those already mentioned above, or epoxidized soybean oil or linseed oil, compounds containing acetoacetate groups, in particular acetoacetylated polyols, butyrolactone, carbonates, aldehydes, isocyanates or silicones having reactive groups;

solvents;

further amines, especially monoamines such as, in particular, benzylamine or furfurylamine or aromatic polyamines such as, in particular, 4,4'-, 2,4' and/or 2,2'-diaminodiphenylmethane, 2,4- and/or 2,6-tolylenediamine, 3,5-dimethylthio-2,4-tolylenediamine and/or 3,5-dimethylthio-2,6-tolylenediamine, 3,5-diethyl-2,4-tolylenediamine and/or 3,5-diethyl-2,6-tolylenediamine;

compounds having mercapto groups, in particular liquid mercaptan-terminated polysulfide polymers, mercaptan-terminated polyoxyalkylene ethers, mercaptan-terminated polyoxyalkylene derivatives, polyesters of thiocarboxylic acids, 2,4,6-trimercapto-1,3,5-triazine, triethylene glycol dimercaptan or ethanedithiol;

polymers, in particular polyamides, polysulfides, polyvinyl formal (PVF), polyvinyl butyral (PVB), polyurethanes (PUR), polymers having carboxyl groups, polyamides, butadiene-acrylonitrile copolymers, styrene-acrylonitrile copolymers, butadiene-styrene copolymers, homo- or copolymers of unsaturated monomers, in particular from the group comprising ethylene, propylene, butylene, isobutylene, isoprene, vinyl acetate or alkyl (meth)acrylates, in particular chlorosulfonated polyethylenes or fluorine-containing polymers or sulfonamide-modified melamines;

fibers, in particular glass fibers, carbon fibers, metal fibers, ceramic fibers or polymer fibers such as polyamide fibers or polyethylene fibers;

pigments, in particular titanium dioxide, iron oxides or chromium (III) oxide;

rheology modifiers, in particular thickeners or antisettling agents;

adhesion improvers, in particular organoalkoxysilanes;

flame-retardant substances, in particular the aluminum hydroxide or magnesium hydroxide fillers already mentioned, antimony trioxide, antimony pentoxide, boric acid $(B(OH)_3)$, zinc borate, zinc phosphate, melamine borate, melamine cyanurate, ammonium polyphosphate, melamine phosphate, melamine pyrophosphate, polybrominated diphenyl oxides or diphenyl ethers, phosphates such as, in particular, diphenyl cresyl phosphate, resorcinol bis(diphenylphosphate), resorcinol diphosphate oligomer, tetraphenylresorcinol diphosphite, ethylenediamine diphosphate, bisphenol A bis(diphenylphosphate), tris(chloroethyl) phosphate, tris(chloropropyl) phosphate, tris(dichloroisopropyl) phosphate, tris[3-bromo-2,2-bis(bromomethyl)propyl] phosphate, tetrabromobisphenol A, bis(2,3-dibromopropyl ether) of bisphenol A, brominated epoxy resins, ethylenebis(tetrabromophthalimide), ethylenebis(dibromonorbornanedicarboximide), 1,2-bis(tribromophenoxy)ethane, tris(2,3-dibromopropyl) isocyanurate, tribromophenol, hexabromocyclododecane, bis(hexachlorocyclopentadieno)cyclooctane or chloroparaffins; or additives, especially dispersed paraffin wax, film-forming auxiliaries, wetting agents, leveling agents, defoamers, deaerators, stabilizers against oxidation, heat, light or UV radiation, or biocides.

The epoxy resin composition preferably comprises further auxiliaries and additives, especially pigments, wetting agents, leveling agents and/or defoamers.

In the epoxy resin composition, the ratio of the number of groups reactive toward epoxy groups relative to the number of epoxy groups is preferably in the range from 0.5 to 1.5, in particular 0.7 to 1.2.

The primary and secondary amino groups present in the epoxy resin composition, and any other groups present that are reactive toward epoxy groups, react with the epoxy groups, resulting in ring opening (addition reaction) thereof. As a result primarily of this reaction, the composition polymerizes and thereby cures.

The resin component and the curing agent component of the epoxy resin composition are stored in separate containers. Further constituents of the epoxy resin composition may be present as a constituent of the resin component or of the curing agent component; further constituents reactive toward epoxy groups are preferably a constituent of the curing agent component. It is likewise possible for further constituents to be present as a dedicated, further component.

A suitable container for storage of the resin component or the curing agent component is especially a vat, a hobbock, a bag, a bucket, a can, a cartridge or a tube. The components are storable, meaning that they can be stored prior to use for several months up to one year or longer without any change in their respective properties to a degree relevant to their use. For the use of the epoxy resin composition, the components are mixed with one another shortly before or during application. The mixing ratio between the resin component and the curing agent component is preferably chosen such that the groups of the curing agent component that are reactive toward epoxy groups are in a suitable ratio to the epoxy groups of the resin component, as described above. In parts by weight, the mixing ratio between the resin component and the curing agent component is typically in the range from 1:10 to 10:1.

The components are mixed by means of a suitable method; this mixing may be done continuously or batchwise. If the mixing does not immediately precede the application, it has to be ensured that not too much time passes between the mixing of the components and the application and that the application is effected within the pot life. The mixing is especially effected at ambient temperature, which is typically within the range from about 5 to 40° C., preferably about 10 to 35° C. Curing by chemical reaction begins with the mixing of the two components, as described above. The curing typically proceeds at a temperature in the range from 0 to 150° C. It preferably proceeds at ambient temperature and typically extends over a few days to weeks. The duration depends upon factors including the temperature, the reactivity of the constituents, and the stoichiometry thereof, and on the presence of accelerators.

The epoxy resin composition is applied to at least one substrate, the following substrates being particularly suitable:

glass, glass ceramic, concrete, mortar, cement screed, fiber cement, brick, tile, gypsum or natural rocks such as granite or marble;

repair or leveling compounds based on PCC (polymer-modified cement mortar) or ECC (epoxy resin-modified cement mortar);

metals or alloys such as aluminum, iron, steel, copper, other nonferrous metals, including surface-upgraded metals or alloys such as galvanized or chrome-plated metals;

asphalt or bitumen;

leather, textiles, paper, wood, woodbase materials bonded with resins, e.g. phenolic, melamine or epoxy resins, resin-textile composites or further so-called polymer composites;

plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFRP), glass fiber-reinforced plastics (GFRP) and sheet molding compounds (SMC);

insulation foams, especially made of EPS, XPS, PUR, PIR, rock wool, glass wool or foamed glass;

coated or painted substrates, especially painted tiles, coated concrete, powder-coated metals or alloys or painted metal sheets;

coatings, paints or varnishes, especially coated floors that are overcoated with a further floor covering layer.

If required, the substrates can be pretreated prior to application, especially by physical and/or chemical cleaning methods or the application of an activator or a primer.

The curing of the epoxy resin composition described affords a cured composition.

The epoxy resin composition described is advantageously usable as coating, primer, adhesive, sealant, encapsulating compound, casting resin, or as matrix for fiber composites such as, in particular, CFRP or GFRP. The term "coating" also covers primers, paints, varnishes and sealants.

The epoxy resin composition is preferably used as coating or adhesive.

The epoxy resin composition described is more preferably used as a coating. Coatings are understood here to mean coverings of all kinds that are applied over an area, especially floor coverings, paints, varnishes, sealants, primers or protective coatings, especially also those for heavy-duty corrosion protection.

The epoxy resin composition is particularly suitable as a floor covering or floor coating for interiors such as offices, industrial halls, gym halls or cooling spaces, or outdoors for balconies, terraces, parking decks, bridges or roofs, as a protective coating for concrete, cement, metals, plastics or wood, for example for surface sealing of wood constructions, vehicles, loading areas, tanks, silos, shafts, pipelines, machines or steel constructions, for example of ships, piers, offshore platforms, lock gates, hydroelectric power plants, river constructions, swimming pools, wind turbines, bridges, chimneys, cranes or sheet-pile walls, or as an undercoat, tiecoat or anticorrosion primer or for hydrophobization of surfaces.

Particularly advantageously, the epoxy resin composition described is used in low-emission coatings with environmental quality seals, for example according to Emicode (EC1 Plus), AgBB, DIBt, Der Blaue Engel, AFSSET, RTS (M1) and US Green Building Council (LEED).

For use as a coating, the epoxy resin composition advantageously has a fluid consistency with low viscosity and good leveling properties. The mixed composition is, within the pot life, typically applied to the surface of a substrate as a thin film having a layer thickness of about 50 μm to about 5 mm, typically at ambient temperature. Application is effected especially by pouring onto the substrate to be coated and subsequent homogeneous distribution with the aid, for example, of a coating bar or a notched trowel. Application can also be effected with a brush or roller or in the form of a spray application, for example as an anticorrosion coating on steel. Curing typically gives rise to substantially homogeneous, glossy and nontacky films of high hardness which have good adhesion to a wide variety of different substrates.

The invention further provides a method of coating, comprising the steps of (i) mixing the components of the epoxy resin composition described, (ii) applying the mixed composition to a substrate within the pot life, followed by the curing of the mixed composition.

It is possible to apply a further coating to the fully or partly cured composition, in which case said further layer may likewise be an epoxy resin composition, or else another material, especially a polyurethane or polyurea coating.

Particular preference is also given to using the epoxy resin composition described as an adhesive. When used as adhesive, after the components have been mixed, the epoxy resin composition typically has a pasty consistency with structurally viscous properties. On application, the mixed adhesive is applied within the pot life to at least one of the substrates to be bonded and the substrates are joined to form an adhesive bond within the open time of the adhesive.

The mixed adhesive is applied especially by means of a brush, roll, spatula, doctor blade or trowel, or from a tube, cartridge or metering device.

The adhesive is particularly suitable for uses in the construction industry, especially for the reinforcement of built structures by means of steel lamellas or lamellas made of carbon fiber-reinforced composite plastics (CFRP), for constructions containing bonded precast concrete components, especially bridges or concrete towers, for example for wind turbines, shafts, pipelines or tunnels, or for constructions containing bonded natural rocks, ceramic elements or parts made of fiber cement, steel, cast iron, aluminum, wood or polyester, for the anchoring of anchors or steel bars in boreholes, for the fixing of, for example, handrails, railings or doorframes, for repairs such as, in particular, the filling of edges, holes or joins in concrete maintenance, or for the bonding of films of polyvinyl chloride (PVC), flexibilized polyolefin (Combiflex®) or adhesion-modified chlorosulfonated polyethylene (Hypalon®) to concrete or steel.

Further fields of use relate to structural bonding in the construction or manufacturing industry, especially as adhesive mortar, assembly adhesive, reinforcement adhesive such as, in particular, for the bonding of lamellas of CFRP or steel to concrete, brickwork or wood, as element adhesive, for example for bridge elements, sandwich element adhesive, facade element adhesive, reinforcing adhesive, bodywork adhesive or half-shell adhesive for rotor blades of wind turbines.

Such an epoxy resin adhesive is likewise suitable for the filling of cavities such as fissures, cracks or drillholes, wherein the adhesive is filled or injected into the cavity and fills it after curing, and bonds or sticks the flanks of the cavity to one another in a force-fitting manner.

The invention further provides a method of bonding, comprising the steps of
(i) mixing the components of the epoxy resin composition described,
(ii) applying the mixed composition within the pot life,
either to at least one of the substrates to be bonded and joining the substrates to form a bond within the open time,
or into a cavity or gap between two or more substrates and optionally inserting an anchor into the cavity or gap within the open time, followed by the curing of the mixed composition.

An "anchor" refers here more particularly to a rebar, a threaded rod or a bolt. An anchor is especially adhesive-bonded or anchored in a wall, ceiling or foundation in such a way that a portion thereof is bonded in a force-fitting manner and a portion thereof protrudes and can be subjected to a construction load.

Identical or different substrates may be bonded.

The application and curing of the epoxy resin composition described, or the method of coating or the method of bonding, affords an article coated or bonded with the composition. This article may be a built structure or part thereof, especially a built structure above or below the ground, an office, an industrial hall, a sports hall, a chill room, a silo, a bridge, a roof, a staircase, a balcony, a terrace or a parking deck, or it may be an industrial good or a consumer good, especially a pier, an offshore platform, a lock gate, a crane, a bulkhead, a pipeline or a rotor blade of a wind turbine, or a mode of transport such as, in particular, an automobile, a truck, a rail vehicle, a ship, an aircraft or helicopter, or an installable component thereof.

The invention thus further provides an article obtained from the described method of coating or from the described method of bonding.

The epoxy resin composition described features advantageous properties. It is inexpensive and has good processability, especially also with little or no thinner, such that low-emission or emission-free products are obtainable. It has a long pot life, rapid curing even under cold conditions and high robustness to blushing-related defects, especially also under moist and cold conditions, a high glass transition temperature and low brittleness; it also shows barely any tendency to yellowing. It is particularly suitable for use as coating, especially for floors, or as adhesive, which are applied at ambient temperatures.

EXAMPLES

Working examples are adduced hereinafter, which are intended to elucidate the invention described. The invention is of course not limited to these described working examples.

"AHEW" stands for amine hydrogen equivalent weight.
"EEW" stands for epoxy equivalent weight.
"Standard climatic conditions" refer to a temperature of 23±1° C. and a relative air humidity of 50±5%.
Description of the Measurement Methods:

Viscosity was measured on a thermostated Rheotec RC30 cone-plate viscometer (cone diameter 50 mm, cone angle 1°, cone tip-plate distance 0.05 mm, shear rate 10 s$^{-1}$).

Amine value was determined by means of titration (with 0.1N HClO$_4$ in acetic acid versus crystal violet).

Substances and Abbreviations Used:
Sikafloor®-264N (A) Sikafloor®-264N component A (RAL 5005), filled pigmented resin component of an epoxy resin floor coating, EEW 450 g/eq (from Sika)
Sikadur®-30 (A) Sikadur®-30 component A, quartz-filled resin component of a structural epoxy resin adhesive, containing bisphenol A diglycidyl ether and butane-1,4-diol diglycidyl ether, EEW about 700 g/eq (from Sika)
B-EDA N-benzylethane-1,2-diamine, prepared as described below, AHEW 50.1 g/eq
B-PDA N-benzylpropane-1,2-diamine, prepared as described below, AHEW 54.8 g/eq
TEPA tetraethylenepentamine, AHEW about 30 g/eq (technical grade, from Huntsman)
BHMT bis(6-aminohexyl)amine, AHEW about 43 g/eq (Dytek® BHMT-HP, from Invista)
BHMT-50 technical grade quality of bis(6-aminohexyl)amine with a purity in the range from 50% to 78% by weight, AHEW about 48 g/eq (Dytek® BHMT Amine (50-78%), from Invista)
PEI polyethyleneimine, average molecular weight about 800 g/mol, AHEW about 38 g/eq (Lupasol® FG, from BASF)
IPDA 3-aminomethyl-3,5,5-trimethylcyclohexylamine, AHEW 42.6 g/eq (Vestamin® IPD, from Evonik)
BAC 1,3-bis(aminomethyl)cyclohexane, AHEW 35.5 g/eq (from Mitsubishi Gas Chemical)
TMD 2,2(4),4-trimethylhexamethylenediamine, AHEW 39.6 g/eq (Vestamin® TMD from Evonik)
MPMD 1,5-diamino-2-methylpentane, AHEW 29.0 g/eq (Dytek® A, from Invista)
Adduct-1 adduct of propylene-1,2-diamine and technical grade o-cresyl glycidyl ether, prepared as described below, AHEW 90 g/eq
DMAPAPA 3-(3-(dimethylamino)propylamino)propylamine, AHEW 53 g/eq (DMAPAPA, from Arkema).
Ca nitrate solution 50% by weight of calcium nitrate tetrahydrate in water
Ancamine® K54 2,4,6-tris(dimethylaminomethyl)phenol (from Air Products)
Quartz flour grain size 0 to 75 μm
Quartz sand grain size 0.1 to 0.3 mm
Precipitated chalk stearate-coated precipitated chalk (Socal® U1S2, from Solvay)
B-EDA and B-PDA are amines A1. TEPA, BHMT, BHMT-50 and PEI are amines A2.

N-Benzylethane-1,2-Diamine (B-EDA):

A round-bottom flask was initially charged with 180.3 g (3 mol) of ethylene-1,2-diamine under a nitrogen atmosphere at room temperature. With good stirring, a solution of 106.0 g (1 mol) of benzaldehyde in 1200 ml of isopropanol was slowly added dropwise, and the mixture was stirred for 2 hours. The reaction mixture was then hydrogenated in a continuous hydrogenation apparatus with a Pd/C fixed bed catalyst at a hydrogen pressure of 80 bar, a temperature of 80° C. and a flow rate of 5 ml/min. To monitor the reaction, IR spectroscopy was used to check whether the imine band at about 1665 cm$^{-1}$ had disappeared. Thereafter, the hydrogenated solution was concentrated on a rotary evaporator at 65° C., removing unreacted ethylene-1,2-diamine, water and isopropanol. The reaction mixture thus obtained was a clear, pale yellowish liquid having an amine value of 678 mg KOH/g. 50 g of this were distilled at 80° C. under reduced pressure, with collection of 31.3 g of distillate at a vapor temperature of 60 to 65° C. and 0.06 mbar. What was obtained was a colorless liquid having a viscosity of 8.3 mPa·s at 20° C., an amine value of 750 mg KOH/g and a purity, determined by GC, of >97%.

N-Benzylpropane-1,2-Diamine (B-PDA):

A round-bottom flask was initially charged with 444.8 g (6 mol) of propane-1,2-diamine under a nitrogen atmosphere at room temperature. With good stirring, a solution of 212.2 g (2 mol) of benzaldehyde in 1500 ml of isopropanol was slowly added dropwise, and the mixture was stirred for 2 hours. The reaction mixture was then hydrogenated in a continuous hydrogenation apparatus with a Pd/C fixed bed catalyst at a hydrogen pressure of 90 bar, a temperature of 85° C. and a flow rate of 5 ml/min. To monitor the reaction, IR spectroscopy was used to check whether the imine band at about 1665 cm$^{-1}$ had disappeared. Thereafter, the hydrogenated solution was concentrated on a rotary evaporator at 65° C., removing unreacted propane-1,2-diamine, isopropanol and water. A clear, pale yellowish liquid was obtained. 300 g of this were distilled at 80° C. under reduced pressure, with collection of 237.5 g of distillate at a vapor temperature of 60 to 65° C. and 0.08 mbar. A colorless liquid having an amine value of 682 mg KOH/g was obtained, which, by $^1$H NMR, was a mixture of N$^1$-benzylpropane-1,2-diamine and N$^2$-benzylpropane-1,2-diamine in a ratio of about 2/1 and had a GC purity of >97%.

Adduct-1:

An initial charge of 4.15 kg of propylene-1,2-diamine under a nitrogen atmosphere was heated to 70° C. and then, with good stirring, 2.93 kg of Araldite® DY-K (o-cresyl glycidyl ether, technical grade, from Huntsman) was added gradually, with the temperature of the reaction mixture being from 70 to 80° C. After 1 hour at 80° C., the reaction mixture was cooled down and the volatile constituents were removed by distillation by means of a thin-film evaporator (0.5-1 mbar, jacket temperature 115° C.).

Production of Epoxy Resin Compositions:

Examples 1 to 13: Coatings

For each example, the ingredients of the curing agent component indicated in tables 1 to 2 were mixed in the indicated amounts (in parts by weight) by means of a centrifugal mixer (SpeedMixer™ DAC 150, FlackTek Inc.) and stored with the exclusion of moisture.

The resin component used was Sikafloor®-264N comp. A (blue) (from Sika) in the amount specified in tables 1 to 2 (in parts by weight).

The two components of each composition were then processed by means of the centrifugal mixer to give a homogeneous liquid and this was tested immediately as follows:

10 minutes after mixing, the viscosity was measured at 20° C. ("Viscosity (10')").

For the determination of Shore D hardness to DIN 53505, two cylindrical test specimens (diameter 20 mm, thickness 5 mm) in each case were produced. One was stored under standard climatic conditions and hardness was measured after 1 day and after 2 days (1 d SCC and 2 d SCC); the other was stored at 8° C. and 80% relative humidity and hardness was measured after 1 day and after 2 days in the cold state (1 d 8°/80% and 2 d 8°/80%).

A first film was applied to a glass plate in a layer thickness of 500 μm, and this was stored/cured under standard climatic conditions. König hardness (König pendulum hardness, measured according to DIN EN ISO 1522) was determined on this film after 1 day ("König hardness (1 d SCC)"), after 2 days ("König hardness (2 d SCC)"), after 4 days ("König hardness (4 d SCC)"), after 7 days ("König hardness (7 d SCC)") and after 14 days ("König hardness (14 d SCC)"). After 14 days, the appearance of the film was assessed (designated "Appearance (SCC)" in the table). A film was described as "nice" if it had a glossy and nontacky surface with no structure. "Structure" refers to any kind of marking or pattern on the surface. A film with a nontacky surface without structure and with reduced gloss was described as "matt".

A second film was applied to a glass plate in a layer thickness of 500 μm and immediately after application this was stored/cured for 7 days at 8° C. and 80% relative humidity and then for 2 weeks under standard climatic conditions. 24 hours after application, a polypropylene bottletop beneath which a damp sponge had been positioned was placed onto the film. After a further 24 hours, the sponge and the bottletop were removed and positioned at a new point on the film, from which it was in turn removed and repositioned after 24 hours, and this was done a total of 4 times. The appearance of this film was then assessed (designated "Appearance (8°/80%)" in the tables) in the same way as described for Appearance (SCC). Also reported in each case here was the number and kind of visible marks that had formed in the film as a result of the damp sponge and/or the bottletop on top. The number of white-colored spots was reported as "blushing". The intensity of any ring-shaped impression formed by sinking of the first bottletop applied 24 h after application was reported as "ring". Such a ring-shaped impression indicates that the coating is not ready to be walked upon. The König hardness was again determined on the films thus cured, in each case after 7 days at 8° C. and 80% relative humidity ("König hardness (7 d 8°/80%)") and then after a further 2 days under SCC ("König hardness (+2 d SCC)"), 7 days under SCC ("König hardness (+7 d SCC)"), and 14 d under SCC ("König hardness (+14 d SCC)").

As a measure of yellowing, the change in color after stressing in a weathering tester was furthermore determined. For this, a further film was applied to a glass plate in a layer thickness of 500 μm and this was stored/cured under standard climatic conditions for 2 weeks and then stressed for 72 hours (Q-Sun (72 h)) at a temperature of 65° C. in a model Q-Sun Xenon Xe-1 weathering tester having a Q-SUN Daylight-Q optical filter and a xenon lamp having a light intensity of 0.51 W/m² at 340 nm. The color difference ΔE of the thus stressed film versus the corresponding unstressed film was then determined using an NH310 colorimeter from Shenzen 3NH Technology Co. LTD equipped with silicon photoelectric diode detector, light source A, color space measurement interface CIE L*a*b*C*H*. ΔE values up to 5 represent slight yellowing.

The results are reported in tables 1 to 2.

The examples labeled "(Ref.)" are comparative examples.

TABLE 1

Composition and properties of examples 1 to 7.

| Example | 1 (Ref.) | 2 | 3 | 4 | 5 | 6 (Ref.) | 7 |
|---|---|---|---|---|---|---|---|
| Resin comp.: | | | | | | | |
| Sikafloor ®-264N (A) | 450.0 | 450.0 | 450.0 | 450.0 | 450.0 | 450.0 | 450.0 |
| Curing agent comp.: | | | | | | | |
| B-EDA | 50.1 | 45.9 | 42.6 | 37.6 | 30.6 | — | — |
| B-PDA | — | — | — | — | — | 27.4 | 21.9 |
| TEPA | — | 3.0 | 4.5 | 7.5 | 12.0 | — | 6.0 |
| Adduct-1 | — | — | — | — | — | 45.0 | 36.0 |
| Benzyl alcohol | 10.0 | 10.0 | 10.0 | 10.0 | 10.0 | 10.0 | 10.0 |
| Ca nitrate solution | 2.0 | 2.0 | 2.0 | 2.0 | 2.0 | 2.0 | 2.0 |
| Ancamine ® K54 | 2.0 | 2.0 | 2.0 | 2.0 | 2.0 | 2.0 | 2.0 |
| A1/A2 ratio[1] | — | 15.3/1 | 9.5 / 1 | 5/1 | 2.6/1 | — | 3.7/1 |
| Viscosity (10') [Pa · s] | 1.6 | 1.7 | 1.8 | 2.1 | 2.7 | 3.2 | 3.4 |
| Shore D | | | | | | | |
| (1d SCC) | 63 | 71 | 73 | 75 | 76 | 67 | 75 |
| (2d SCC) | 67 | 75 | 75 | 75 | 78 | 73 | 80 |
| Shore D | | | | | | | |
| (1d 8°/80%) | 17 | 49 | 51 | 53 | 60 | n.m. | 9 |
| (2d 8°/80%) | 64 | 69 | 71 | 75 | 77 | 55 | 57 |
| König hardness | | | | | | | |
| (1d SCC) | 43 | 50 | 52 | 53 | 50 | 32 | 59 |
| [s] (2d SCC) | 56 | 74 | 76 | 77 | 80 | 104 | 113 |
| (4d SCC) | 78 | 87 | 92 | 95 | 97 | 141 | 150 |
| (7d SCC) | 94 | 94 | 99 | 105 | 119 | 168 | 168 |
| (14d SCC) | 109 | 111 | 120 | 129 | 126 | 168 | 169 |
| Appearance (SCC) | nice | nice | nice | nice | nice | nice | nice |
| Q-Sun (72 h) ΔE | 5.3 | 4.8 | 4.4 | 3.4 | 4.9 | 3.5 | 3.8 |
| König h. | | | | | | | |
| [s] (7d 8°/80%) | 9 | 16 | 17 | 21 | 28 | 38 | 41 |
| (+2d SCC) | 20 | 38 | 37 | 45 | 80 | 130 | 122 |
| (+7d SCC) | 29 | 54 | 56 | 71 | 99 | 132 | 125 |
| (+14d SCC) | 46 | 70 | 77 | 94 | 129 | 144 | 139 |
| Appearance | | | | | | | |
| (8°/80%) | nice | nice | nice | nice | matt | matt | matt |
| Blushing | 1 | 1 | 1 | 1 | 1 | 1 | 1 |
| Ring | slight | none | none | none | none | strong | slight |

[1]Weight ratio between amine A1 and amine A2
"n.m." means "not measurable" (too soft)

TABLE 2

Composition and properties of examples 8 to 13.

| Example | 8 | 9 | 10 (Ref.) | 11 (Ref.) | 12 (Ref.) | 13 (Ref.) |
|---|---|---|---|---|---|---|
| Resin comp.: | | | | | | |
| Sikafloor ®-264N (A) | 450.0 | 450.0 | 450.0 | 450.0 | 450.0 | 450.0 |
| Curing agent comp.: | | | | | | |
| B-EDA | 42.6 | 42.6 | 42.6 | 42.6 | 42.6 | 42.6 |
| Amine | BHMT[2] | PEI | IPDA | BAC | TMD | MPMD |
|  | 6.5 | 5.7 | 6.4 | 5.3 | 5.9 | 4.4 |
| Benzyl alcohol | 10.0 | 10.0 | 10.0 | 10.0 | 10.0 | 10.0 |
| Ca nitrate solution | 2.0 | 2.0 | 2.0 | 2.0 | 2.0 | 2.0 |
| Ancamine ® K54 | 2.0 | 2.0 | 2.0 | 2.0 | 2.0 | 2.0 |
| A1/A2 ratio[1] | 6.6 / 1 | 7.5/1 | — | — | — | — |
| Viscosity (10') [Pa · s] | 2.05 | 2.15 | 2.33 | 2.17 | 2.34 | 2.28 |
| Shore D | | | | | | |
| (1d SCC) | 70 | 75 | 71 | 44 | 72 | 72 |
| (2d SCC) | 71 | 73 | 76 | 63 | 76 | 76 |
| Shore D | | | | | | |
| (1d 8°/80%) | 53 | 48 | 45 | 53 | 50 | 48 |
| (2d 8°/80%) | 70 | 72 | 68 | 70 | 69 | 68 |
| König hardness | | | | | | |
| (1d SCC) | 39 | 53 | 41 | 43 | 38 | 31 |
| [s] (2d SCC) | 60 | 78 | 78 | 71 | 70 | 59 |
| (4d SCC) | 74 | 94 | 97 | 83 | 83 | 71 |
| (7d SCC) | 85 | 99 | 106 | 90 | 92 | 77 |
| (14d SCC) | 104 | 122 | 125 | 140 | 105 | 97 |
| Appearance (SCC) | nice | nice | nice | nice | nice | nice |
| Q-Sun (72 h) ΔE | 6.6 | 5.6 | 5.6 | 5.5 | 5.8 | 5.7 |
| König h. | | | | | | |
| [s] (7d 8°/80%) | 14 | 17 | 13 | 14 | 10 | 13 |
| (+2d SCC) | 34 | 36 | 42 | 33 | 33 | 25 |
| (+7d SCC) | 59 | 55 | 60 | 43 | 50 | 36 |
| (+14d SCC) | 83 | 73 | 76 | 59 | 71 | 57 |
| Appearance (8°/80%) | nice | matt | matt/tacky | matt/tacky | matt/tacky | matt/tacky |
| Blushing | 1 | 1 | 1 | 3 | 3 | 1 |
| Ring | none | none | none | none | none | none |

[1]Weight ratio between amine A1 and amine A2
[2]dissolved in B-EDA

Examples 14 to 20: (Adhesives)

For each example, the ingredients of the curing agent component specified in table 3 were mixed in the specified amounts (in parts by weight) by means of a centrifugal mixer (SpeedMixer™ DAC 150, FlackTek Inc.) and stored with exclusion of moisture.

The resin component used was Sikadur®-30 component A (from Sika) in the amount specified in table 3 (in parts by weight).

For each example, the resin component and the curing agent component were then processed by means of the centrifugal mixer to give a homogeneous paste and this was immediately tested as follows:

Pot life was determined under standard climatic conditions by moving the mixed adhesive by means of a spatula every 5 min until the adhesive had thickened to such an extent that it was no longer processable.

The mechanical properties were determined by applying and curing the mixed adhesive under standard climatic conditions to a silicone mold to give dumbbell-shaped specimens having a thickness of 10 mm and a length of 150 mm with a gage length of 80 mm and a gage width of 10 mm. The tensile specimens were removed from the mold after a curing time of 7 days, and these were used to measure tensile strength ("TS") and elongation at break ("EaB") to EN ISO 527 at a strain rate of 1 mm/min.

The characteristics of the surface were assessed on the dumbbell-shaped specimens to determine the mechanical properties on the side exposed to the air in the course of curing. A nontacky surface was referred to as "smooth".

Lap shear strength on steel (LSS steel) was measured by producing multiple adhesive bonds, wherein the mixed adhesive was applied between two heptane-degreased steel sheets in a layer thickness of 0.5 mm with an overlapping bonding area of 10×25 mm. After a storage time of 7 days under standard climatic conditions, lap shear strength was determined to DIN EN 1465 at a strain rate of 10 mm/min.

Lap shear strength on carbon fiber composite (CRP) (LSS CRP) was measured by producing multiple adhesive bonds, wherein the mixed adhesive was applied between two heptane-degreased Sika® CarboDur® S512 lamellas in a layer thickness of 0.5 mm with an overlapping bonding area of 10×50 mm. After a storage time of 7 days under standard climatic conditions, lap shear strength was determined as described.

Compressive strength ("CS") was determined by applying the mixed adhesive under standard climatic conditions in a silicone mold to give cuboids of dimensions 12.7×12.7×25.4 mm and curing them under standard climatic conditions. After 7 days, several such cuboids were removed from the mold and compressed to destruction as per ASTM D695 at a testing speed of 1.3 mm/min, reading off the compressive strength value at the maximum force in each case.

Tg (glass transition temperature) was determined by means of DSC on cured adhesive samples that had been stored under standard climatic conditions for 14 days with a Mettler Toledo DSC 3+ 700 instrument and the following measurement program: (1) −10° C. for 2 min, (2) −10 to 200° C. at a heating rate of 10 K/min (=1st run), (3) 200 to −10° C. at a cooling rate of −50 K/min, (4) −10° C. for 2 min, (5) −10 to 180° C. at a heating rate of 10 K/min (=2nd run).

The results are reported in table 3.

The examples labeled "(Ref.)" are comparative examples.

TABLE 3

Composition and properties of examples 14 to 20.

| Example | 14 (Ref.) | 15 (Ref.) | 16 | 17 | 18 | 19 | 20 |
|---|---|---|---|---|---|---|---|
| Resin comp.: | | | | | | | |
| Sikadur ®-30 (A) | 300.0 | 300.0 | 300.0 | 300.0 | 300.0 | 300.0 | 300.0 |
| Curing agent comp.: | | | | | | | |
| B-EDA | 21.5 | 15.8 | 13.6 | 10.8 | 10.8 | 7.1 | 5.6 |
| TEPA | — | — | 1.5 | 3.0 | — | 3.0 | 3.0 |
| BHMT-50 | — | — | — | — | 4.8 | 3.5 | 5.0 |
| DMAPAPA | — | 6.0 | 6.0 | 6.0 | 6.0 | 6.0 | 6.0 |
| Quartz flour | 35.3 | 35.2 | 35.2 | 36.5 | 34.7 | 36.6 | 36.6 |
| Quartz sand | 28.2 | 28.0 | 28.7 | 28.7 | 28.7 | 28.8 | 28.8 |
| Precipitated chalk | 15.0 | 15.0 | 15.0 | 15.0 | 15.0 | 15.0 | 15.0 |
| A1/A2 ratio[1] | — | — | 9.7/1 | 3.6/1 | 2.3/1 | 1.1/1 | 1/1.4 |
| Pot life | | | | | | | |
| [h:min] | 2:00 | 1:30 | 1:20 | 1:15 | 1:30 | 1:30 | 1:30 |
| TS [MPa] | 34 | 35 | 36 | 31 | 40 | 37 | 35 |
| EaB [%] | 0.3 | 0.3 | 0.3 | 0.2 | 0.3 | 0.3 | 0.3 |
| Surface | smooth | smooth | smooth | smooth | smooth | smooth | smooth |
| LSS steel | | | | | | | |
| [MPa] | 6.2 | 11.2 | 10.6 | 10.8 | 12.5 | 13.7 | 15.2 |
| LSS CRP | | | | | | | |
| [MPa] | 8.3 | 8.5 | 9.0 | 10.0 | 12. | 10.2 | 10.0 |
| CS [MPa] | 90 | 109 | 111 | 107 | 111 | 109 | 110 |
| Tg 1st/2nd run | 48/57 | 58/60 | 58/68 | 59/68 | 57/63 | 61/64 | 61/69 |

[1]Weight ratio between amine A1 and amine A2

The invention claimed is:

1. A curing agent for epoxy resins comprising:
at least one amine A1 which is N-benzylethane-1,2-diamine,
and at least one amine A2 which is a polyalkyleneamine or polyethyleneimine, wherein the at least one amine A2 is in an unadducted form,
where the weight ratio between amine A1 and amine A2 is in the range from 20/1 to 2/1.

2. The curing agent as claimed in claim 1, wherein the amine A2 is a polyalkyleneamine of the formula (II)

   (II)

where
x is an integer from 1 to 6, and
B is independently an alkylene radical having 2 to 6 carbon atoms.

3. The curing agent as claimed in claim 1, wherein the weight ratio between amine A1 and amine A2 is in the range from 15/1 to 2/1.

4. The curing agent as claimed in claim 1, wherein the weight ratio between amine A1 and amine A2 is in the range from 10/1 to 2/1.

5. The curing agent as claimed in claim 1, wherein it comprises at least one further amine selected from the group consisting of 2,2 (4),4-trimethylhexane-1,6-diamine, 1,2-, 1,3- or 1,4-diaminocyclohexane, 1,3-bis(aminomethyl)cyclohexane, 1,4-bis(aminomethyl)cyclohexane, bis(4-aminocyclohexyl) methane, 1-amino-3-aminomethyl-3,5,5-trimethylcyclohexane, 2 (4)-methyl-1,3-diaminocyclohexane, 1,3-bis(aminomethyl)benzene, polyoxypropylenediamines having an average molecular weight $M_n$ in the range from 200 to 500 g/mol, 3-(3-(dimethylamino) propylamino) propylamine, adducts of these or further polyamines with mono- or diepoxides, and Mannich bases.

6. The curing agent as claimed in claim 5, wherein the further amine present is 1-amino-3-aminomethyl-3,5,5-trimethylcyclohexane.

7. The curing agent as claimed in claim 5, wherein the further amine present is 3-(3-(dimethylamino) propylamino) propylamine.

8. An epoxy resin composition comprising
a resin component comprising at least one epoxy resin and
a curing agent component comprising the curing agent as claimed in claim 1.

9. The epoxy resin composition as claimed in claim 8, wherein it comprises at least one further constituent selected from the group consisting of thinners, accelerators and fillers.

10. A method of coating, comprising the steps of
(i) mixing the components of the epoxy resin composition as claimed in claim 8, (ii) applying the mixed composition to a substrate within the pot life, followed by the curing of the mixed composition.

11. A method of bonding, comprising the steps of
(i) mixing the components of the epoxy resin composition as claimed in claim 8,
(ii) applying the mixed composition within the pot life,
either to at least one of the substrates to be bonded and joining the substrates to form a bond within the open time,
or into a cavity or gap between two or more substrates and optionally inserting an anchor into the cavity or gap within the open time,
followed by the curing of the mixed composition.

12. An article obtained from a method as claimed in claim 10.

13. The curing agent as claimed in claim 1, wherein the amine A2 is selected from the group consisting of triethylenetetramine, tetraethylenepentamine, pentaethylenehexamine, and N,N'-bis(3-aminopropyl)ethylenediamine.

* * * * *